(12) United States Patent
Gao et al.

(10) Patent No.: US 10,243,701 B2
(45) Date of Patent: Mar. 26, 2019

(54) WIRELESS COMMUNICATION METHOD AND WIRELESS COMMUNICATION DEVICE

(71) Applicant: Panasonic Intellectual Property Corporation of America, Torrance, CA (US)

(72) Inventors: Chi Gao, Beijing (CN); Hidetoshi Suzuki, Kanagawa (JP); Masayuki Hoshino, Kanagawa (JP); Seigo Nakao, Singapore (SG)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 0 days.

(21) Appl. No.: 15/409,361

(22) Filed: Jan. 18, 2017

(65) Prior Publication Data
US 2017/0126367 A1 May 4, 2017

Related U.S. Application Data

(63) Continuation of application No. PCT/CN2014/085751, filed on Sep. 2, 2014.

(51) Int. Cl.
| | |
|---|---|
| *H04W 4/00* | (2018.01) |
| *H04L 1/18* | (2006.01) |
| *H04W 72/04* | (2009.01) |

(52) U.S. Cl.
CPC .......... *H04L 1/1816* (2013.01); *H04L 1/189* (2013.01); *H04L 1/1822* (2013.01); *H04L 1/1887* (2013.01); *H04W 72/042* (2013.01)

(58) Field of Classification Search
CPC ....... H04L 1/18; H04L 1/1822; H04L 1/1816; H04L 1/1887; H04L 1/189; H04W 28/04; H04W 72/04; H04W 72/042

See application file for complete search history.

(56) References Cited

U.S. PATENT DOCUMENTS 8,281,202 B2 * 10/2012 Tseng
9,762,356 B2 * 9/2017 Rudolf et al.
(Continued)

FOREIGN PATENT DOCUMENTS

| CN | 101132262 A | 2/2008 |
| CN | 101500259 A | 8/2009 |

(Continued)

OTHER PUBLICATIONS

3GPP TS 25.308, 3rd Generation Partnership Project; Technical Specification Group Radio Access Network; High Speed Downlink Packet Access (HSDPA); Overall description; Stage 2 (Release 6), Technical Specification, 28 pages, 2004.*

(Continued)

*Primary Examiner* — Frank Duong
(74) *Attorney, Agent, or Firm* — Seed IP Law Group LLP

(57) ABSTRACT

The present disclosure provides wireless communication methods for repeated transmission of channels, and wireless communication devices therefor. In one embodiment, the gap between the starting subframe of a first channel and the starting subframe of a second channel is defined or configured. In another embodiment, Mx*W=M and Mx*n=N is satisfied, where Mx is the number of subframes reserved for the channel in one HARQ process, M is RTT for one HARQ process, W is a positive integer and represents the maximum number of HARQ processes transmitting the channel within M subframes, N is the gap between the starting subframes of the channel in two HARQ processes, and n is a positive integer. In yet another embodiment, time-frequency resources for the channel in different HARQ processes are different.

18 Claims, 10 Drawing Sheets

(56) References Cited

U.S. PATENT DOCUMENTS

| | | |
|---|---|---|
| 9,979,514 B2 | 5/2018 | Tseng |
| 2010/0058135 A1 | 3/2010 | Tseng |
| 2013/0051289 A1 | 2/2013 | Hsieh et al. |
| 2015/0245323 A1 | 8/2015 | You et al. |
| 2015/0280876 A1 | 10/2015 | You et al. |

FOREIGN PATENT DOCUMENTS

| | | |
|---|---|---|
| JP | 2010-057179 A | 3/2010 |
| WO | 2014/077577 A1 | 5/2014 |
| WO | 2014/109621 A1 | 7/2014 |

OTHER PUBLICATIONS

International Search Report dated May 25, 2015, for corresponding International application No. PCT/CN2014/085751, 2 pages.
LG Electronics, "PDSCH transmission for MTC coverage enhancement", 3GPP TSG-RAN WG1#76 R1-140309, Feb. 10, 2014, pp. 1-5.

* cited by examiner

600 transmitting or receiving channel repetitions of the channel in multiple subframes to or from a second wireless communication device in multiple HARQ processes — S601

1400 transmitting or receiving channel repetitions of the channel in multiple subframes to or from a second wireless communication device in multiple HARQ processes — S1401

WIRELESS COMMUNICATION METHOD AND WIRELESS COMMUNICATION DEVICE

BACKGROUND

1. Technical Field

The present disclosure relates to the field of wireless communication, and in particular, to wireless communication methods for repeated transmission/reception of channels (channel repetitions), and wireless communication devices such as eNode B (eNB) and user equipment (UE).

2. Description of the Related Art

Machine-Type Communication (MTC) is an important revenue stream for operators and has a huge potential from the operator's perspective. Based on the market and operators' requirements, one of the important requirements of MTC is improving the coverage of MTC UEs. To enhance the MTC coverage, almost each of the physical channels needs to be enhanced. And the repeated transmission/reception in time domain is the main method to improve the coverage of the channels. The repeated transmission/reception is to repeatedly transmit/receive a channel or to repeatedly transmit/receive a signal on the channel, the channel or the signal on the channel, which is repeatedly transmitted/received, is referred as the channel repetitions. And to satisfy multiple different coverage requirements, multiple repetition levels can be supported while each of the repetition level corresponds to one or multiple integral repetition numbers. The repetition number is a number of repetitions of the channel in the repeated transmission. Each of the repetitions will be transmitted in one subframe; therefore, multiple subframes will be used for transmitting the repetitions of the channel.

For uplink (UL) and downlink (DL) data transmission, HARQ (Hybrid Automatic Repeat Request) process can be used. In each HARQ process, control channel and data channel are included, and sometimes a feedback channel (ACK/NACK channel) for the data packet can also be included. The control channel carries the scheduling information of the data packet. The data channel carries the data packet and is transmitted in the way indicated by the control channel. When the receiver received the data packet and decoded it successfully, information of ACK (Acknowledgement) is transmitted to the data transmitter to inform the successful decoding. Otherwise, NACK (Negative-Acknowledgement) is transmitted.

SUMMARY

In view of the above, one non-limiting and exemplary embodiment facilitates providing wireless communication methods for repeated transmission of channels, and wireless communication devices such as eNB or UE.

In a first general aspect of the present disclosure, there is provided a wireless communication method performed by a first wireless communication device, comprising: transmitting or receiving channel repetitions of a first channel in multiple subframes to or from a second wireless communication device; and transmitting or receiving channel repetitions of a second channel in multiple subframes to or from the second wireless communication device, wherein a gap between a starting subframe of the first channel and a starting subframe of the second channel is defined or configured.

According to the first general aspect of the present disclosure, the starting subframe of a second channel following a first channel can be determined regardless of the repetition number used by the first channel.

In a second general aspect of the present disclosure, there is provided a wireless communication method performed by a first wireless communication device, comprising: transmitting or receiving channel repetitions of channel in multiple subframes to or from a second wireless communication device in multiple hybrid automatic repeat request (HARQ) processes, wherein $Mx*W=M$, where $Mx$ is the number of subframes reserved for the channel in one HARQ process, M is Round Trip Time (RTT) for one HARQ process, and W is a positive integer and represents the maximum number of HARQ processes within M subframes; and $Mx*n=N$, where N is a gap between starting subframes of the channel in two HARQ processes, and n is a positive integer.

According to the second general aspect of the present disclosure, resource collision of a channel among different HARQ processes can be avoided.

In a third general aspect of the present disclosure, there is provided a wireless communication method performed by a first wireless communication device, comprising: transmitting or receiving channel repetitions of a channel in multiple subframes to or from a second wireless communication device in multiple hybrid automatic repeat request (HARQ) processes, wherein time-frequency resources for the channel in different HARQ processes are different.

According to the third general aspect of the present disclosure, resource collision of a channel among different HARQ processes can be avoided.

In a fourth general aspect of the present disclosure, there is provided a wireless communication device, comprising: a first communication unit configured to transmit or receive channel repetitions of a first channel in multiple subframes to or from a second wireless communication device; and a second communication unit configured to transmit or receive channel repetitions of a second channel in multiple subframes to or from the second wireless communication device, wherein a gap between a starting subframe of the first channel and a starting subframe of the second channel is defined or configured.

According to the fourth general aspect of the present disclosure, the starting subframe of a second channel following a first channel can be determined regardless of the repetition number used by the first channel.

In a fifth general aspect of the present disclosure, there is provided a wireless communication device, comprising: a communication unit configured to transmit or receive channel repetitions of a channel in multiple subframes to or from a second wireless communication device in multiple hybrid automatic repeat request (HARQ) processes, wherein $Mx*W=M$, where $Mx$ is the number of subframes reserved for the channel in one HARQ process, M is Round Trip Time (RTT) for one HARQ process, and W is a positive integer and represents the maximum number of HARQ processes transmitting the channel within M subframes; and $Mx*n=N$, where N is a gap between starting subframes of the channel in two HARQ processes, and n is a positive integer.

According to the fifth general aspect of the present disclosure, resource collision of a channel among different HARQ processes can be avoided.

In a sixth general aspect of the present disclosure, there is provided a wireless communication device, comprising: a communication unit configured to transmit or receive channel repetitions of a channel in multiple subframes to or from a second wireless communication device in multiple hybrid automatic repeat request (HARQ) processes, wherein time-frequency resources for the channel in different HARQ processes are different.

According to the sixth general aspect of the present disclosure, resource collision of a channel among different HARQ processes can be avoided.

The foregoing is a summary and thus contains, by necessity, simplifications, generalization, and omissions of details. Other aspects, features, and advantages of the devices and/or processes and/or other subject matters described herein will become apparent in the teachings set forth herein. The summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

Figure 1:
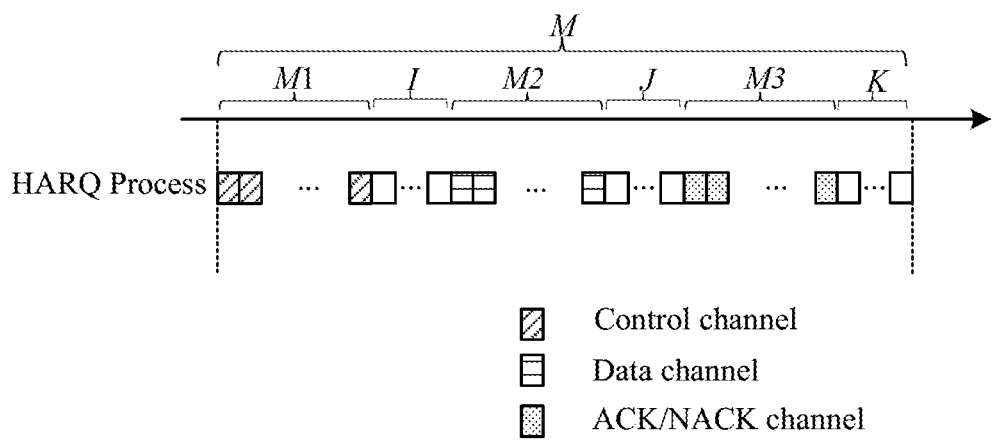
FIG. 1 schematically illustrates a HARQ process chart.

In the following detailed description, reference is made to the accompanying drawings, which form a part thereof. In the drawings, similar symbols typically identify similar components, unless context dictates otherwise. It will be readily understood that the aspects of the present disclosure can be arranged, substituted, combined, and designed in a wide variety of different configurations, all of which are explicitly contemplated and make part of this disclosure.

It is noted that although the embodiments of the present disclosure may be described in the context of MTC, the present disclosure can be applied to any communication which needs channel repetitions. In addition, in the present disclosure, the term of "wireless communication device" refers an eNB and a UE depending on different scenarios. For example, for an UL HARQ process, the wireless communication for transmitting the control channel and receiving the data channel is an eNB, and the wireless communication for receiving the control channel and transmitting the data channel is a UE.

In one HARQ process which may be uplink or downlink, at least a control channel and a data channel are included. In additional, a channel carrying ACK or NACK may also be included. As shown in FIG. 1 which schematically illustrates a HARQ process, the number of subframes reserved for the control channel, the scheduled data channel (or simply referred to as data channel) and the corresponding ACK/NACK channel are M1, M2 and M3, respectively. The gap between the control channel subframes and the scheduled data channel subframes is I subframes. The gap between the scheduled data channel and the corresponding ACK/NACK channel subframes is J subframes. The gap between the ACK/NACK channel subframes and the next candidate of control channel in this HARQ process is K subframes. Wherein M1 and M2 are positive integers, and I, J, K, M3 are integers not less than zero. When M3=0, there is no specific ACK/NACK channel for the data transmission. M is Round Trip Time (RTT) for one HARQ process. RTT is the time it takes for a transmitter to send a request and the receiver to send a response back to the transmitter. In particular, RTT can be the gap between two starting subframes of a channel (e.g. control channel) in the same HARQ process, i.e., the gap between the starting subframe of a candidate of a channel and the starting subframe of the next candidate of the channel in the same HARQ process. Alternatively, RRT can also be defined as M=M1+M2+M3+1+J+K.

As described in the above, channel repetition in time domain (i.e. repeated transmission of a channel) can be used to improve the coverage of the channels. Each of the repetitions of a channel (channel repetitions) will be transmitted in one subframe, and thus multiple subframes will be used for transmitting the repetitions of the channel. When one or more channels in one HARQ process are transmitted repeatedly, i.e. channel repetitions are applied, the starting subframes of the repetitions of the channels needs to be defined.

First Embodiment

The repetition of a channel such as the control channel can be dynamically changed according to the channel state, scheduling situation, etc. There is big probability that the repetition number is blindly detected. The repetition number ambiguity may lead to the starting subframe of the following channel unknown. For example, the data channel should be started after successful decoding of corresponding control channel, and then the receiver can know the exact resources for the data channel. However, when the repetition of control channel is dynamically changed according to the channel state, scheduling situation, etc., the receiver cannot know the exact starting of the data channel's repetitions.

Figure 2:
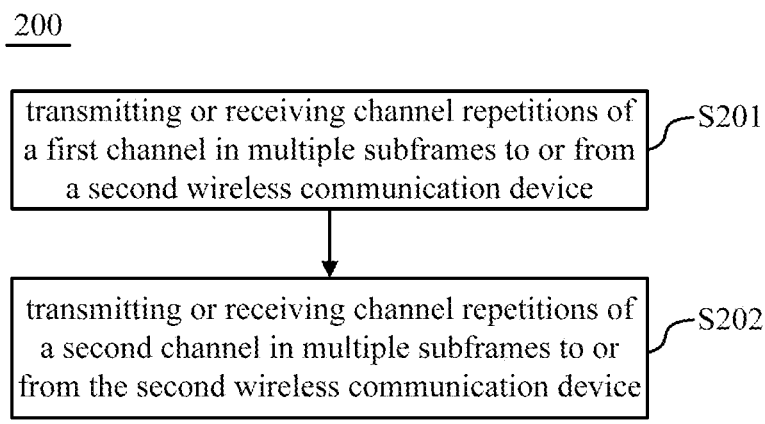
FIG. 2 illustrates a flowchart of a wireless communication method for repeated transmission of channels according to an embodiment of the present disclosure.

In order to solve this issue, an embodiment of the present disclosure provides a wireless communication method 200 performed by a first wireless communication device for repeated transmission of channels, as shown in FIG. 2 which illustrates a flowchart of the wireless communication method 200. Here, the first wireless communication device is a UE or eNB according to different scenarios. When the first wireless communication device is a UE, the second wireless communication described later is an eNB, and vice versa.

The method 200 comprises a step 201 of transmitting or receiving channel repetitions of a first channel in multiple subframes to or from a second wireless communication device, and a step 202 of transmitting or receiving channel repetitions of a second channel in multiple subframes to or from the second wireless communication device. Here, the first channel and the second channel can be any of the control channel, the data channel and the feedback channel respectively, and the transmission of the first channel is followed by the transmission of the second channel. The method 200 can be applied to both UL and DL. For example, assume that the first channel is the control channel and the second channel is the data channel, for a DL transmission, when the first wireless communication device is an eNB, the step 201 would be that the first wireless device (eNB) transmits channel repetitions of the first channel (control channel) in multiple subframes to the second wireless communication device (UE), and the step 202 would be that the first wireless device (eNB) transmits channel repetitions of the second channel (data channel) in multiple subframes to the second wireless communication device (UE); when the first wireless communication device is a UE, the step 201 would be that the first wireless device (UE) receives channel repetitions of the first channel (control channel) in multiple subframes from the second wireless communication device (eNB), and the step 202 would be that the first wireless device (UE) receives channel repetitions of the second channel (data channel) in multiple subframes from the second wireless communication device (eNB). For a UL transmission, when the first wireless communication device is an eNB, the step 201 would be that the first wireless device (eNB) transmits channel repetitions of the first channel (control channel) in multiple subframes to the second wireless communication device (UE), and the step 202 would be that the first wireless device (eNB) receives channel repetitions of the second channel (data channel) in multiple subframes from the second wireless communication device (UE); when the first wireless communication device is a UE, the step 201 would be that the first wireless device (UE) receives channel repetitions of the first channel (control channel) in multiple subframes from the second wireless communication device (eNB), and the step 202 would be that the first wireless device (UE) transmits channel repetitions of the second channel (data channel) in multiple subframes to the second wireless communication device (eNB).

In order to get knowledge of the starting subframe of the second channel following the first channel, in this embodiment, the gap between the starting subframe of the first channel and the starting subframe of the second channel is defined or configured. Therefore, both the first wireless communication device and the second wireless communication device can know the starting subframe of the second channel. Here, the term of "define" means the way of determining the gap or the value of the gap is fixedly set in the first and second wireless communication devices and cannot change during the communication, for example, is determined by the specification. The term of "configure" means the way of determining the gap or the value of the gap is signaled by signaling, for example by physical, MAC or RRC signaling. In the following, the ways of determining the gap are described in detail by examples.

Figure 3:
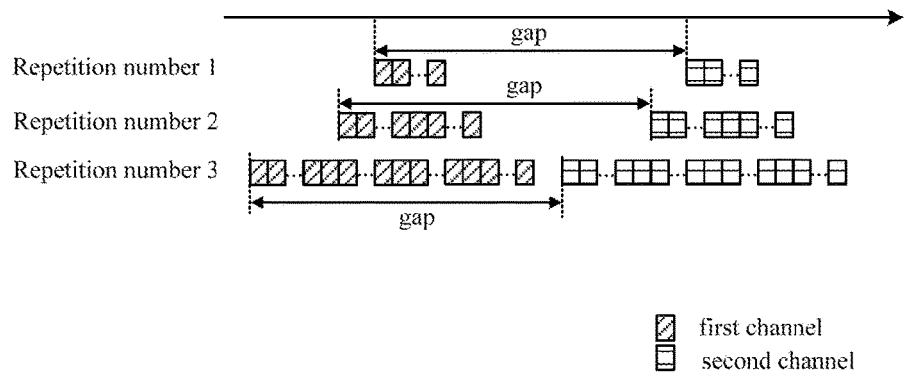
FIG. 3 schematically illustrates the gaps between the starting subframes of the first channel and the starting subframes of the second channel for three exemplary repetition numbers of the first channel.

In a first example, the gap between the starting subframe of the first channel and the starting subframe of the second channel can be the same in one HARQ process for one UE regardless of the repetition number and the starting subframe of the first channel. FIG. 3 schematically illustrate the gaps between the starting subframe of the first channel and the starting subframe of the second channel for three exemplary repetition numbers of the first channel. As shown in FIG. 3, even though the three repetition numbers are different and the starting subframes of the three repetition numbers are also different, the gaps are the same, all are r subframes. Therefore, the receiver (UE or eNB) can know the starting subframe of the second channel independently from the repetition number of the first channel. For example, when the first channel is (E)PDCCH and the second channel is PDSCH (Physical Downlink Shared Channel), the receiving UE can know the starting subframe of PDSCH independently from repetition number of (E)PDCCH.

In a second example, the gap between the starting subframe of the first channel and the starting subframe of the second channel can be associated with the maximum repetition number defined or configured for the first channel between the first wireless communication device and the second wireless communication device. From system's perspective, there are multiple repetition levels, and each repetition level includes at least one repetition number for one type of channel, i.e. multiple repetition numbers can be supported in each repetition level. Therefore, there can be at least two possibilities for transmitting channel repetitions. Firstly, a transmitter can transmit a channel by any repetition level, in other words, a channel can be transmitted with any repetition number of any repetition level. Therefore, it is possible for the transmitter to transmit the channel by the maximum repetition number of all the repetition levels. In this case, the gap can be associated with the maximum repetition number of all the repetition levels, for example, the gap can be the same as or larger than the maximum repetition number of all the repetition levels. Secondly, in a certain period, a transmitter can transmit a channel only by a repetition number within one repetition level. In this case, for one UE in one period, the channel can possibly be transmitted by the maximum repetition number within the one repetition level configured or defined for the UE. Therefore, the gap can be determined by (i.e. associated with) each repetition level or the maximum repetition number within each repetition level. For example, the gap can be the same as or larger than the maximum repetition number within each repetition level. It is noted that the period here can be any period, even the whole operation lifetime, in other words, for one UE, some channel can be transmitted always by one repetition level. Take Table 1 as an example, repetition level R1, R2 and R3 correspond to gap value g1, g2, and g3, respectively. For example, when the repetition level is determined to be R1, the gap is g1 which can be the same as or larger than R1 assuming R1 represents the maximum repetition number of the repetition level R1.

TABLE 1

| Repetition level | Gap value (subframe) |
| --- | --- |
| R1 | g1 |
| R2 | g2 |
| R3 | g3 |

It is noted that the maximum repetition number defined or configured for the first channel between the first wireless communication device and the second wireless communication device in the second example comprises the above two cases, i.e., the maximum repetition number of all the repetition levels and the maximum repetition number within the one repetition level configured or defined for the UE, since both the maximum repetition numbers are the maximum repetition number defined or configured for the first channel between the first wireless communication device and the second wireless communication device.

Figure 4:
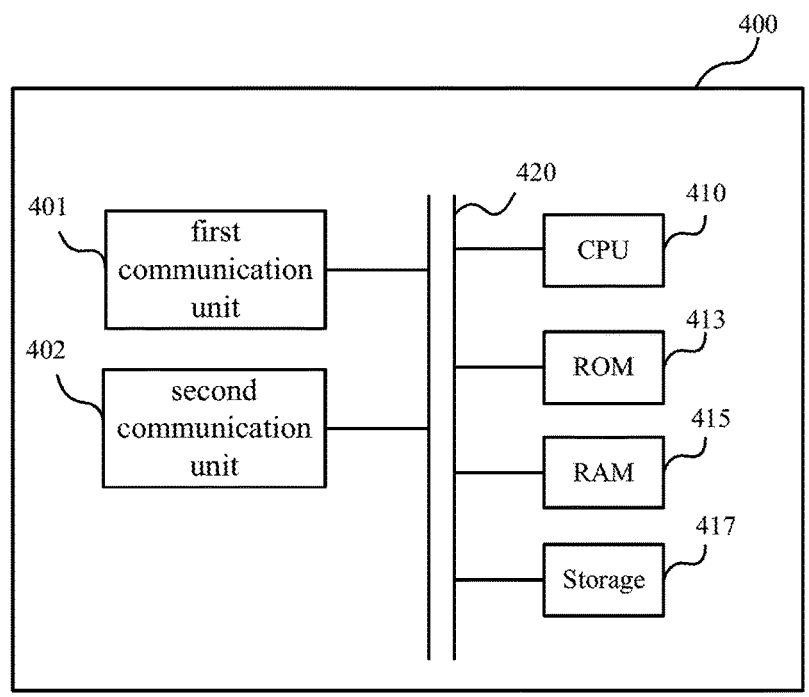
FIG. 4 is a block diagram illustrating a wireless communication device for repeated transmission of channels according to an embodiment of the present disclosure.

In the first embodiment, a wireless communication device for performing the above method is also provided. FIG. 4 is a block diagram illustrating a wireless communication device 400 for repeated transmission of channels according to an embodiment of the present disclosure. The device 400 comprises: a first communication unit 401 (transceiver, a transmitter or a receiver) configured to transmit or receive channel repetitions of a first channel in multiple subframes to or from a second wireless communication device; and second communication unit 402 (transceiver, transmitter or receiver) configured to transmit or receive channel repetitions of a second channel in multiple subframes to or from the second wireless communication device, wherein the gap between the starting subframe of the first channel and the starting subframe of the second channel is defined or configured.

The wireless communication device 400 according to the present disclosure may optionally include a CPU (Central Processing Unit) 410 for executing related programs to process various data and control operations of respective units in the wireless device 400, a ROM (Read Only Memory) 413 for storing various programs required for performing various process and control by the CPU 410, a RAM (Random Access Memory) 415 for storing intermediate data temporarily produced in the procedure of process and control by the CPU 410, and/or a storage unit 417 for storing various programs, data and so on. The above communication unit 401, CPU 410, ROM 413, RAM 415 and/or storage unit 417 etc. may be interconnected via data and/or command bus 420 and transfer signals between one another.

Respective units as described above do not limit the scope of the present disclosure. According to one implementation of the disclosure, the functions of the above first communication unit 401 and second communication unit 402 may be implemented by hardware, and the above CPU 410, ROM 413, RAM 415 and/or storage unit 417 may not be necessary. Alternatively, the functions of the above first communication unit 401 and second communication unit 402 may also be implemented by functional software in combination with the above CPU 410, ROM 413, RAM 415 and/or storage unit 417 etc.

According to the first embodiment of the present disclosure, the starting subframe of a second channel following a first channel can be determined regardless of the repetition number used by the first channel.

Second Embodiment

Figures 5, 6:
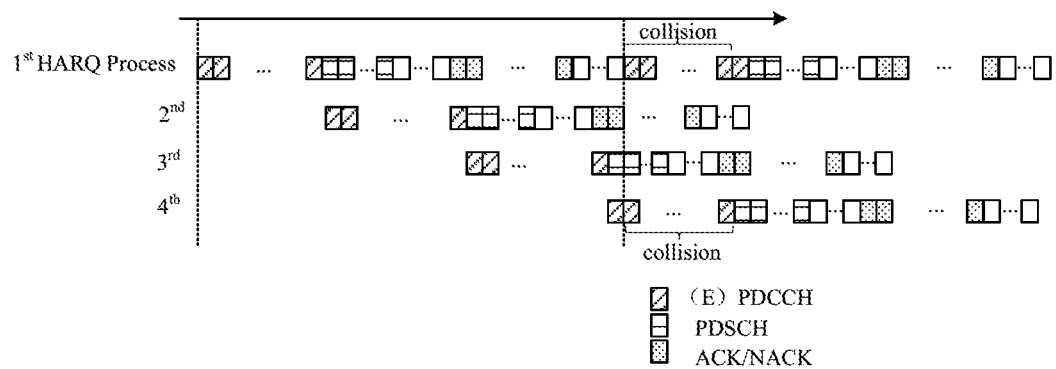
FIG. 5 illustrates an exemplary resource collision in which the repetitions of (E)PDDCH in the first HARQ process is collided with the repetitions of the (E)PDDCH in the fourth HARQ process.
FIG. 6 illustrates a flowchart of a wireless communication method for repeated transmission of a channel according to an embodiment of the present disclosure.

In repeated transmission of a channel, when there are multiple different HARQ processes, the control channels (or data channels or feedback channels) of multiple HARQ processes may overlap. The overlap may cause resource efficiency reduction or resource collision. For example, when the collision channel is (E)PDCCH, it means there are multiple (E)PDCCHs for DL grant to one UE in one subframe, which will increase the resource blocking probability in (E)PDCCH search space. FIG. 5 illustrates an exemplary resource collision in which the repetitions of (E)PDDCH in the first HARQ process is collided with the repetitions of the (E)PDDCH in the fourth HARQ process. When the collision channel is PDSCH or PUSCH (Physical Uplink Shared Channel), it means there are multiple data packets transmitted in one subframe for one UE. It needs multiple pieces of control signaling to inform the scheduling information, which is a waste of control channel. When the collision channel is the channel carrying ACK/NACK, the resource collision may cause the ACK/NACK not received correctly. It is noted that, in the present disclosure, "different HARQ processes" does not mean that the HARQ processes must have different indexes, but mean that the HARQ processes are started separately and they may have the same index or different indexes. For example, in FIG. 5, the $1^{st}$, $2^{nd}$, $3^{rd}$, $4^{th}$ HARQ processes are different HARQ processes which are started separately in different starting subframes, but they may have the same index or different indexes.

In order to solve this issue, an embodiment of the present disclosure provides a wireless communication method 600 performed by a first wireless communication device for repeated transmission of a channel, as shown in FIG. 6 which illustrates a flowchart of the wireless communication method 600. Here, the first wireless communication device can be a UE or eNB. When the first wireless communication device is a UE, the second wireless communication described later is an eNB, and vice versa.

The method 600 can comprise a step 601 of transmitting or receiving channel repetitions of the channel in multiple subframes to or from a second wireless communication device in multiple HARQ processes. Similar to the first embodiment, the method 600 can be applied to both UL and DL. The channel can be any one of a control channel, a scheduled channel and an ACK/NCK channel.

In the second embodiment, $Mx*W=M$ is satisfied, where Mx is the number of subframes reserved for the channel in one HARQ process, M is Round Trip Time (RTT) for one HARQ process, and W is a positive integer and represents the maximum number of HARQ processes transmitting the channel within M subframes. In addition, $Mx*n=N$ is also satisfied in the second embodiment, where N is the gap between the starting subframes of the channel in two HARQ processes, and n is a positive integer. The detailed description of Mx and M can refer to the description with reference to FIG. 1, which will not be repeated here. According to the second embodiment, the repetitions of a channel in one HARQ process will not overlap the repetitions of the channel in another HARQ process.

In the following, the second embodiment will be described in detail through several examples.

Figure 7:
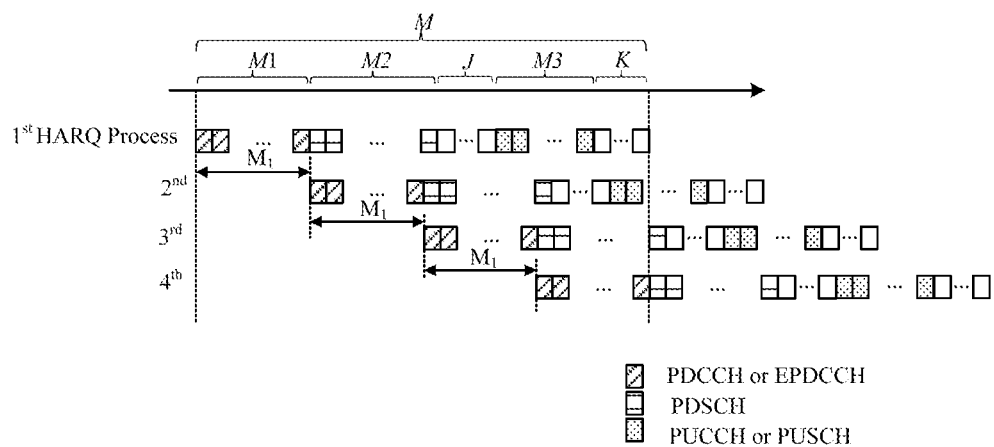
FIG. 7 illustrates exemplary DL HARQ processes for avoiding the resource collision of the control channel.

In a first example as shown in FIG. 7, exemplary DL HARQ processes are illustrated for avoiding the resource collision of the control channel. For a DL HARQ process, the control channel and data channel are PDCCH or EPD-CCH ((E)PDCCH) and PDSCH respectively, and the ACK/NACK channel is PUCCH (Physical Uplink Control Channel) or PUSCH. For a DL HARQ process, I=0 where I is the gap between the control channel subframes and the scheduled data channel subframes as shown in FIG. 1. In this example, the solution is used to avoid the resource collision of the control channel among DL HARQ processes of one UE. As shown in FIG. 7, M1 is the number of subframes reserved for PDCCH or EPDCCH, wherein M1*W=M and M1*n=N. In the figure, W=4 (i.e., 4M1=M), which is just an example. By using the solution, there is no resource collision of the control channel among the HARQ processes.

Figure 8:
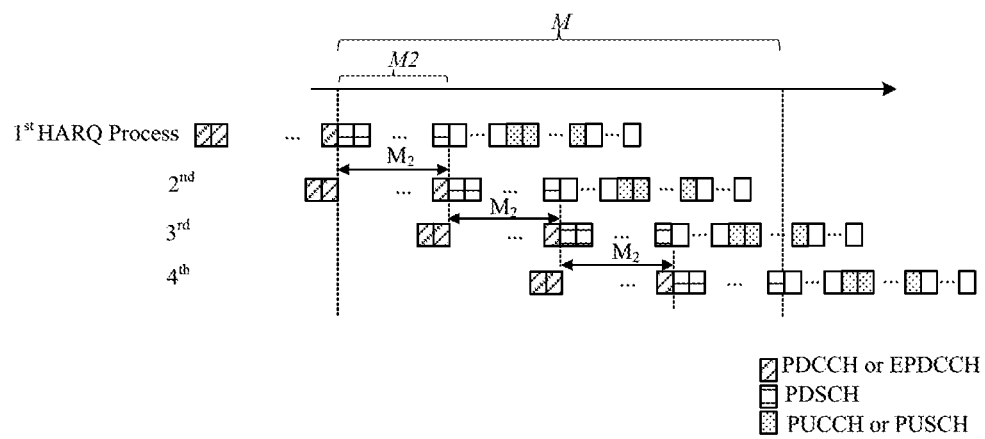
FIG. 8 illustrates exemplary DL HARQ processes for avoiding the resource collision of the data channel.

In a second example as shown in FIG. 8, exemplary DL HARQ processes are illustrated for avoiding the resource collision of the data channel among DL HARQ processes of one UE. As shown in FIG. 8, M2 is the number of subframes reserved for PDSCH, wherein M2*W=M and M2*n=N. In the figure, W=4 (i.e., 4M2=M), which is just an example. By using the solution, there is no resource collision of the data channel among the HARQ processes.

Figure 9:
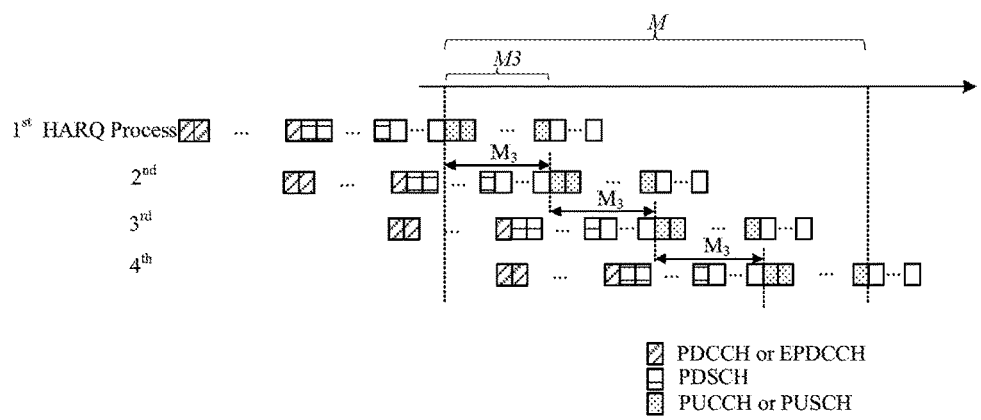
FIG. 9 illustrates exemplary DL HARQ processes for avoiding the resource collision of the ACK/NACK channel.

In a third example as shown in FIG. 9, exemplary DL HARQ processes are illustrated for avoiding the resource collision of the ACK/NACK channel among DL HARQ processes of one UE. As shown in FIG. 9, M3 is the number of subframes reserved for PUCCH or PUSCH, wherein M3*W=M and M3 n=N. In the figure, W=4 (i.e., 4M3=M), which is just an example. By using the solution, there is no resource collision of the ACK/NACK channel among the HARQ processes.

In the above first to third examples, the DL HARQ processes are described, while in the following fourth to sixth examples, the DL HARQ processes will be described. For a UL HARQ process, the control channel and the data channel are (E)PDCCH and PUSCH respectively, and the ACK/NACK channel is Physical Hybrid-ARQ Indicator Channel (PHICH). For a UL HARQ process, I=0. For UL data transmission, there are two possible cases to trigger retransmission:

Case 1: Triggered by PHICH+(E)PDCCH, which means that PHICH will carry the ACK/NACK of UL data, but it can be overridden by the NDI (New Data Indicator) in DCI carried by PDCCH or EPDCCH. As a result, the whole procedure of one UL data transmission includes (E)PDCCH, PUSCH and PHICH.

Case 2: Triggered by (E)PDCCH or EPDCCH, which means no need to transmit PHICH. Therefore, (E)PDCCH and PUSCH are enough in the whole HARQ procedure.

Figure 10:
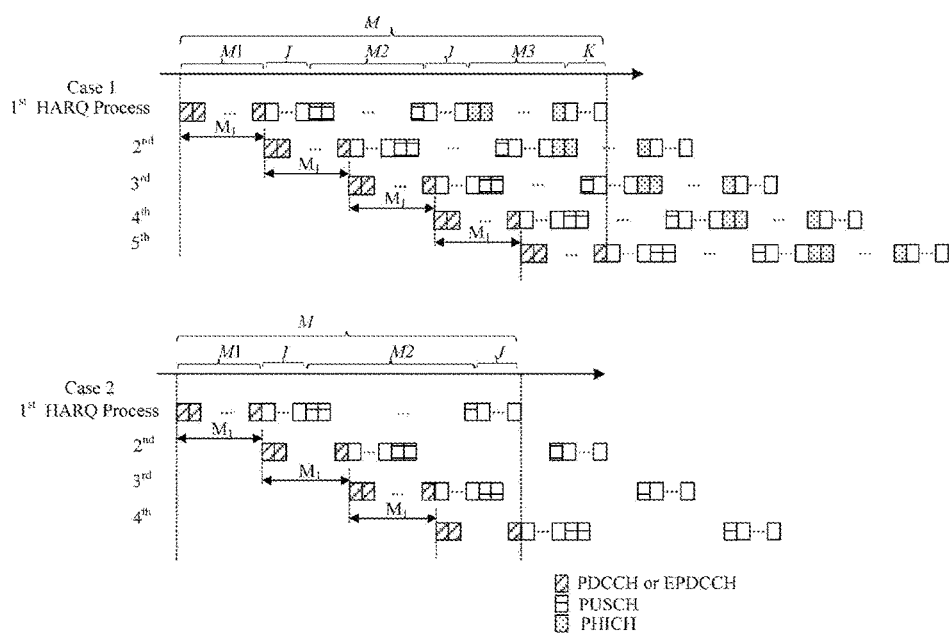
FIG. 10 illustrates exemplary UL HARQ processes for avoiding the resource collision of the control channel.

In the fourth example as shown in FIG. 10, exemplary UL HARQ processes are illustrated for avoiding the resource collision of the control channel among UL HARQ processes of one UE. As shown in FIG. 10, M1 is the number of subframes reserved for PDCCH or EPDCCH, wherein M1*W=M and M1*n=N. In the figure, W=5 (Case 1) or 4 (Case 2), which is only an example. By using the solution, there is no resource collision of the control channel among the UL HARQ processes.

Figure 11:
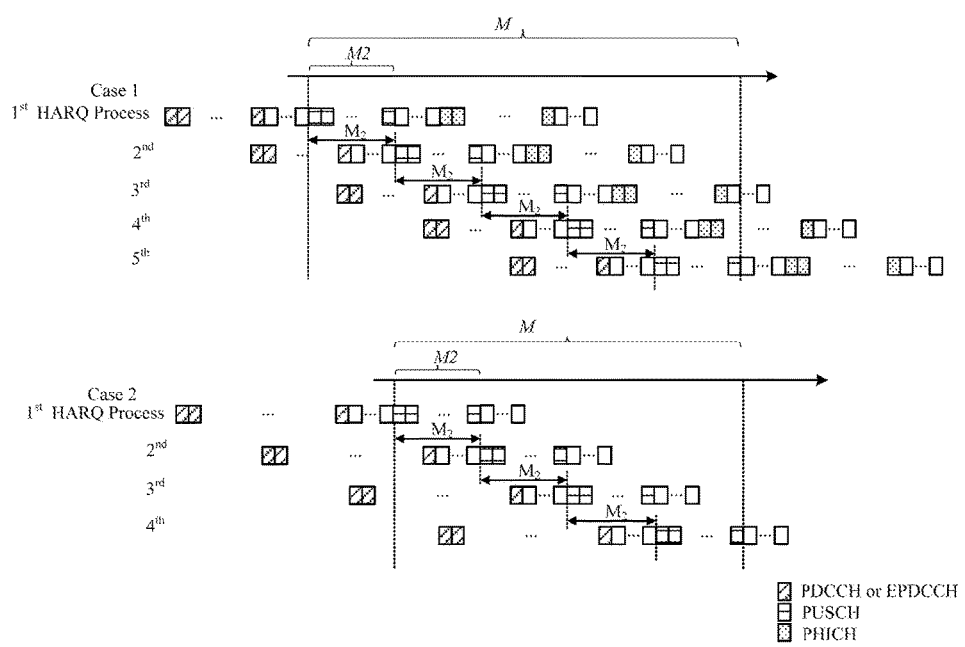
FIG. 11 illustrates exemplary UL HARQ processes for avoiding the resource collision of the data channel.

In the fifth example as shown in FIG. 11, exemplary UL HARQ processes are illustrated for avoiding the resource collision of the data channel among UL HARQ processes of one UE. As shown in FIG. 11, M2 is the number of subframes reserved for PUSCH, wherein M1*W=M and M1*n=N. In the figure, W=5 (Case 1) or 4 (Case 2), which is only an example. By using the solution, there is no resource collision of the data channel among the UL HARQ processes.

Figure 12:
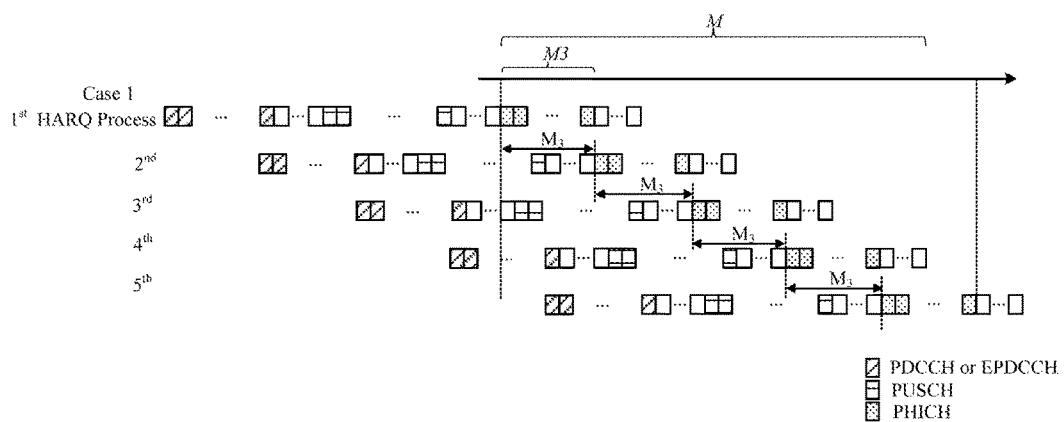
FIG. 12 illustrates exemplary UL HARQ processes for avoiding the resource collision of the ACK/NACK channel.

In the sixth example as shown in FIG. 12, exemplary UL HARQ processes are illustrated for avoiding the resource collision of PHICH among UL HARQ processes of one UE. As shown in FIG. 12, M3 is the number of subframes reserved for PHICH, wherein M3*W=M and M1*n=N. In the figure, W=5, which is only an example. By using the solution, there is no resource collision of PHICH among the UL HARQ processes.

Figure 13:
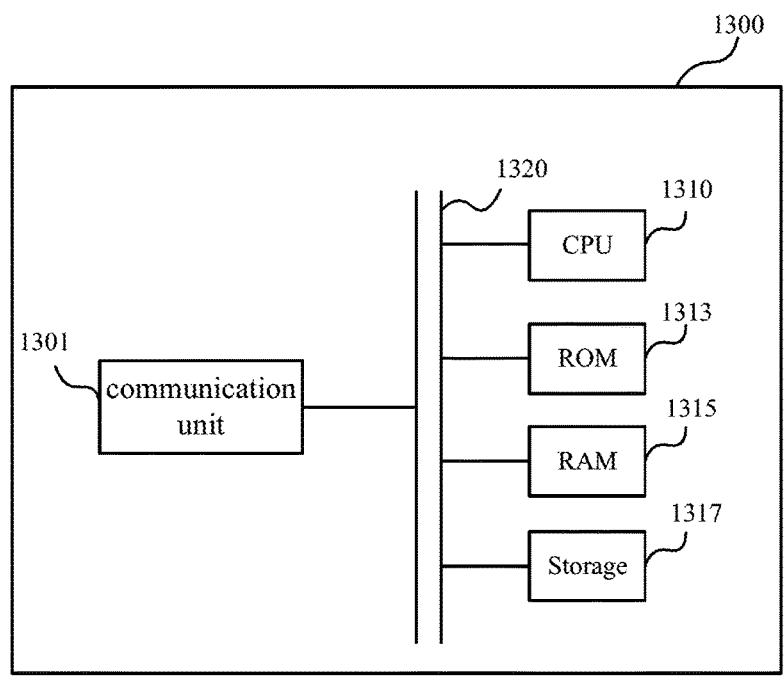
FIG. 13 is a block diagram illustrating a wireless communication device for repeated transmission of a channel according to an embodiment of the present disclosure.

In the second embodiment, a wireless communication device for performing the above method is also provided. FIG. 13 is a block diagram illustrating a wireless communication device 1300 for repeated transmission of a channel according to an embodiment of the present disclosure. The device 1300 comprises: a communication unit 1301 (transceiver, transmitter or receiver) configured to transmit or receive channel repetitions of the channel in multiple subframes to or from a second wireless communication device in multiple hybrid automatic repeat request (HARQ) processes, wherein Mx*W=M is satisfied, where Mx is the number of subframes reserved for the channel in one HARQ process, M is Round Trip Time (RTT) for one HARQ process, and W is a positive integer and represents the maximum number of HARQ processes transmitting the channel within M subframes; and Mx*n=N, where N is the gap between the starting subframes of the channel in two HARQ processes, and n is a positive integer.

The wireless communication device 1300 according to the present disclosure may optionally include a CPU (Central Processing Unit) 1310 for executing related programs to process various data and control operations of respective units in the wireless device 1300, a ROM (Read Only Memory) 1313 for storing various programs required for performing various process and control by the CPU 1310, a RAM (Random Access Memory) 1315 for storing intermediate data temporarily produced in the procedure of process and control by the CPU 1310, and/or a storage unit 1317 for storing various programs, data and so on. The above communication unit 1301, CPU 1310, ROM 1313, RAM 1315 and/or storage unit 1317 etc. may be interconnected via data and/or command bus 1320 and transfer signals between one another.

Respective units as described above do not limit the scope of the present disclosure. According to one implementation of the disclosure, the functions of the above communication unit 1301 may be implemented by hardware, and the above CPU 1310, ROM 1313, RAM 1315 and/or storage unit 1317 may not be necessary. Alternatively, the functions of the above communication unit 1301 may also be implemented by functional software in combination with the above CPU 1310, ROM 1313, RAM 1315 and/or storage unit 1317 etc.

According to the second embodiment, resource collision of a channel among different HARQ processes can be avoided.

Third Embodiment

The third embodiment provides an alternative way to solve the problem of resource collision of a channel among different HARQ processes as described in the above. There can be more than one time-frequency resources for transmitting signals of each channel in one subframe, and these time-frequency resources are orthogonal. Therefore, when different HARQ processes use different time-frequency resources within a subframe to transmit repetitions of a channel, the resources for the channel in different HARQ processes will not collide even when the subframes they use overlap. For example, the resource for DCIs of different HARQ processes can be different in one control channel domain, which can be used to avoid the resource collision of (E)PDCCH.

Figures 14, 15:
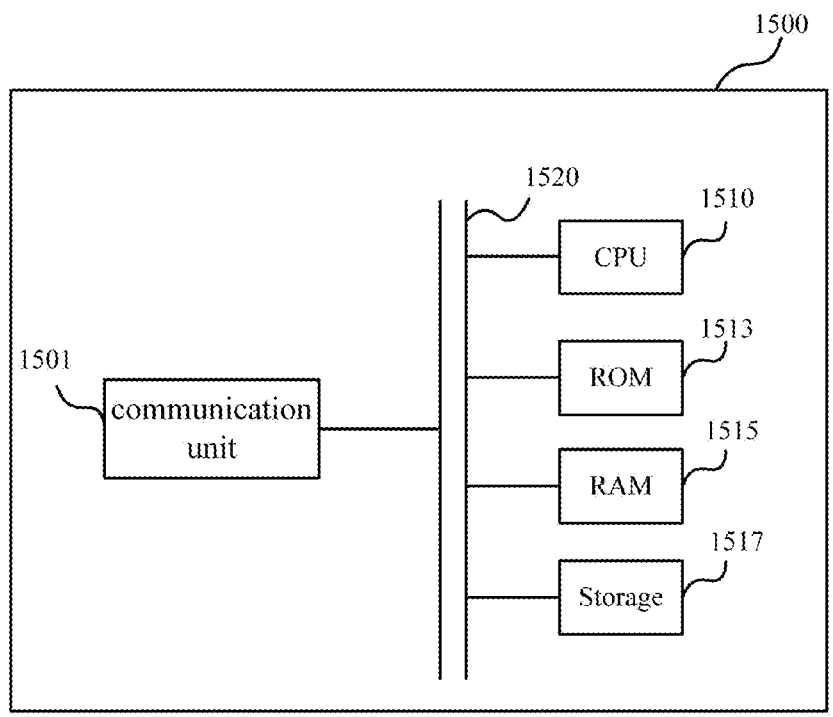
FIG. 14 illustrates a flowchart of a wireless communication method for repeated transmission of a channel according to an embodiment of the present disclosure.
FIG. 15 is a block diagram illustrating a wireless communication device for repeated transmission of a channel according to an embodiment of the present disclosure.

In view of the above, the third embodiment provides a wireless communication method 1400 performed by a first wireless communication device for repeated transmission of a channel, as shown in FIG. 14 which illustrates a flowchart of the wireless communication method 1400. The method 1400 can comprise a step 1401 of transmitting or receiving channel repetitions of the channel in multiple subframes to or from a second wireless communication device in multiple HARQ processes, wherein time-frequency resources for the channel in different HARQ processes are different. Similar to the first and second embodiments, the method 1400 can be applied to both UL and DL. The channel can be any one of a control channel, a scheduled channel and a corresponding ACK/NCK channel. Assuming the channel is the control channel, the PDCCH or EPDCCH of different HARQ processes for one UE can be mapped onto different resources or candidates in the control region in one subframe. For example, PDCCH or EPDCCH of $1^{st}$ HARQ process is mapped onto $1^{st}$ candidate and PDCCH or EPDCCH of $2^{nd}$ HARQ process is mapped onto $2^{nd}$ candidate.

In the third embodiment, a wireless communication device for performing the above method is also provided. FIG. 15 is a block diagram illustrating a wireless communication device 1500 for repeated transmission of a channel according to an embodiment of the present disclosure. The device 1500 comprises: a communication unit 1501 (transceiver, transmitter or receiver) configured to transmit or receive channel repetitions of the channel in multiple subframes to or from a second wireless communication device in multiple hybrid automatic repeat request (HARQ) processes, wherein time-frequency resources for the channel in different HARQ processes are different.

The wireless communication device 1500 according to the present disclosure may optionally include a CPU (Central Processing Unit) 1510 for executing related programs to process various data and control operations of respective units in the wireless device 1500, a ROM (Read Only Memory) 1515 for storing various programs required for performing various process and control by the CPU 1510, a RAM (Random Access Memory) 1515 for storing intermediate data temporarily produced in the procedure of process and control by the CPU 1510, and/or a storage unit 1517 for storing various programs, data and so on. The above communication unit 1501, CPU 1510, ROM 1513, RAM 1515 and/or storage unit 1517 etc. may be interconnected via data and/or command bus 1520 and transfer signals between one another.

Respective units as described above do not limit the scope of the present disclosure. According to one implementation of the disclosure, the functions of the above communication unit 1501 may be implemented by hardware, and the above CPU 1510, ROM 1513, RAM 1515 and/or storage unit 1517 may not be necessary. Alternatively, the functions of the above communication unit 1501 may also be implemented by functional software in combination with the above CPU 1510, ROM 1513, RAM 1515 and/or storage unit 1517 etc.

Figure 16:
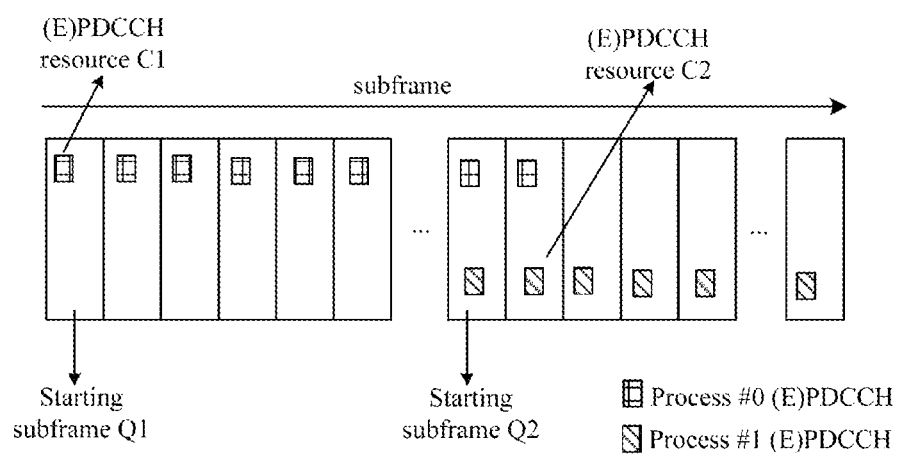
FIG. 16 illustrates an exemplary association of the time-frequency resources and the starting subframes of HARQ processes for (E)PDCCH.

Further, in order to determine the resources or candidates for a channel (e.g. (E)PDCCH), the time-frequency resources for the channel can be associated with the starting subframes of the channel in respective HARQ processes. FIG. 16 illustrates an exemplary association of the time-frequency resources and the starting subframes of HARQ processes for (E)PDCCH. In this example, the index of starting subframe of PDCCH or EPDCCH repetitions is Q (Q1 and Q2 in FIG. 16 which are integers). When mod(Q1, R)=a1 where R is an integer and may be the number of (E)PDCCH resources in one subframe, then the (E)PDCCH resource is C1. When mod(Q2, R)=a2, then the (E)PDCCH resource is C2. C1 and C2 are the (E)PDCCH resource index, e.g., candidate index or (E)CCE set index in the (E)PDCCH region. In the figure, the starting subframes of (E)PDCCH HARQ processes #0 and #1 are Q1 and Q2, respectively. When Q1=150, Q2=200, R=100, mod(Q1, 100)=50 and mod(Q2, 100)=0, then (E)PDCCH in HARQ process #0 will be transmitted in resource C1 (corresponding to a1=50), while (E)PDCCH in HARQ process #1 will be transmitted in resource C2 (corresponding to a2=0). It can be seen that although both (E)PDCCHs in HARQ processes #0 and #1 are transmitted in some subframes, they don't collide. It is noted that, the way of determining the resource index for (E)PDCCH by the module function can also be applied to other channels, and the way of determining the resource index for a channel in a HARQ process is not limited to the described module function approach.

According to the third embodiment of the present disclosure, resource collision of a channel among different HARQ processes can also be avoided.

It is noted that the above embodiments can be implemented individually or in combination unless the context indicates otherwise.

The present invention can be realized by software, hardware, or software in cooperation with hardware. Each functional block used in the description of each embodiment described above can be partly or entirely realized by an LSI such as an integrated circuit, and each process described in the each embodiment may be controlled partly or entirely by the same LSI or a combination of LSIs. The LSI may be individually formed as chips, or one chip may be formed so as to include a part or all of the functional blocks. The LSI may include a data input and output coupled thereto. The LSI here may be referred to as an IC, a system LSI, a super LSI, or an ultra LSI depending on a difference in the degree of integration. However, the technique of implementing an integrated circuit is not limited to the LSI and may be realized by using a dedicated circuit, a general-purpose processor, or a special-purpose processor. In addition, a FPGA (Field Programmable Gate Array) that can be programmed after the manufacture of the LSI or a reconfigurable processor in which the connections and the settings of circuit cells disposed inside the LSI can be reconfigured may be used. The present disclosure can be realized as digital processing or analogue processing. Further, the calculation of each functional block can be performed by using calculating means, for example, including a DSP or a CPU, and the processing step of each function may be recorded on a recording medium as a program for execution. Furthermore, when a technology for implementing an integrated circuit that substitutes the LSI appears in accordance with the advancement of the semiconductor technology or other derivative technologies, it is apparent that the functional block may be integrated by using such technologies.

It is noted that the present invention intends to be variously changed or modified by those skilled in the art based on the description presented in the specification and known technologies without departing from the content and the scope of the present invention, and such changes and applications fall within the scope that claimed to be protected. Furthermore, in a range not departing from the content of the invention, the constituent elements of the above-described embodiments may be arbitrarily combined.

What is claimed is:

1. A wireless communication method performed by a first wireless communication device, the method comprising:
    receiving channel repetitions of a first channel in multiple subframes from a second wireless communication device, the first channel being a control channel including scheduling information; and
    performing one of:
        transmitting channel repetitions of a second channel in multiple subframes to the second wireless communication device, the second channel being a data channel scheduled by the scheduling information; and
        receiving of channel repetitions of a second channel in multiple subframes from the second wireless communication device,
    wherein a gap between a starting subframe of the first channel and a starting subframe of the second channel is defined and/or configured.

2. The wireless communication method according to claim 1, wherein the gap between the starting subframe of the first channel and the starting subframe of the second channel is associated with a repetition number defined or configured for the first channel.

3. The wireless communication method according to claim 2, the first channel is the control channel to transmit downlink control information which indicates the repetition number of first channel.

4. The wireless communication method according to claim 1, wherein the gap between the starting subframe of the first channel and the starting subframe of the second channel is the same in one hybrid automatic repeat request (HARQ) process.

5. The wireless communication method according to claim 3, wherein the gap between the starting subframe of the first channel and the starting subframe of the second channel is the same as a maximum repetition number defined or configured for the first channel.

6. A wireless communication method performed by a first wireless communication device, the method comprising:
    receiving channel repetitions of a first channel in multiple subframes from a second wireless communication device in multiple hybrid automatic repeat request (HARQ) processes, the first channel being a control channel including scheduling information; and
    performing one of:
        transmitting channel repetitions of a second channel in multiple subframes to the second wireless communication device in the multiple HARQ processes, the second channel being a data channel scheduled by the scheduling information; and
        receiving channel repetitions of the second channel in multiple subframes from the second wireless communication device in the multiple HARQ processes,
    wherein Mx*W=M, where Mx is the number of subframes reserved for one of the first channel and the second channel in one HARQ process, M is Round Trip Time (RTT) for one HARQ process, and W is a positive integer and represents the maximum number of HARQ processes within M subframes; and Mx*n=N, where N is a gap between starting subframes of the one of the first channel and the second channel in two HARQ processes, and n is a positive integer.

7. A wireless communication device, comprising:
    a receiver, which, in operation, receives channel repetitions of a first channel in multiple subframes from a second wireless communication device in multiple hybrid automatic repeat request (HARQ) processes, the first channel being a control channel including scheduling information; and
    a transceiver, which, in operation, performs one of:
        transmitting channel repetitions of a second channel in multiple subframes to the second wireless communication device in the multiple HARQ processes, the second channel being a data channel scheduled by the scheduling information; and
        receiving channel repetitions of the second channel in multiple subframes from the second wireless communication device in the multiple HARQ processes,
    wherein Mx*W=M, where Mx is the number of subframes reserved for one of the first channel and the second channel in one HARQ process, M is Round Trip Time (RTT) for one HARQ process, and W is a positive integer and represents the maximum number of HARQ processes within M subframes; and Mx*n=N, where N is a gap between starting subframes of the one of the first channel and the second channel in two HARQ processes, and n is a positive integer.

8. A wireless communication method performed by a first wireless communication device, the method comprising:
    receiving channel repetitions of a first channel in multiple subframes from a second wireless communication device in multiple hybrid automatic repeat request (HARQ) processes, the first channel being a control channel including scheduling information; and
    performing one of:
        transmitting channel repetitions of a second channel in multiple subframes to the second wireless communication device in the multiple HARQ processes, the second channel being a data channel scheduled by the scheduling information; and
        receiving channel repetitions of the second channel in multiple subframes from the second wireless communication device in the multiple HARQ processes,
    wherein time-frequency resources for the first channel in different HARQ processes are different.

9. The wireless communication method according to claim 8, wherein the time-frequency resources for the first channel are associated with a starting subframe of the first channel in each of the HARQ processes.

10. The wireless communication method according to claim 8, wherein the first channel is Physical Downlink Control Channel (PDCCH) or Enhanced PDCCH (EPDCCH).

11. A wireless communication device, comprising:
    a receiver, which, in operation, receives channel repetitions of a first channel in multiple subframes from a second wireless communication device, the first channel being a control channel including scheduling information; and
    a transceiver, which, in operation, performs one of:
        transmitting channel repetitions of a second channel in multiple subframes to the second wireless communication device, the second channel being a data channel scheduled by the scheduling information; and receiving channel repetitions of the second channel in multiple subframes from the second wireless communication device, wherein a gap between a starting subframe of the first channel and a starting subframe of a second channel is defined or configured.

12. The wireless communication device according to claim 11, wherein the gap between the starting subframe of the first channel and the starting subframe of the second channel is associated with a repetition number defined or configured for the first channel.

13. The wireless communication device according to claim 12, the first channel is the control channel to transmit downlink control information which indicates the repetition number of first channel.

14. The wireless communication device according to claim 11, wherein the gap between the starting subframe of the first channel and the starting subframe of the second channel is the same in one hybrid automatic repeat request (HARQ) process.

15. The wireless communication device according to claim 11, wherein the gap between the starting subframe of the first channel and the starting subframe of the second channel is the same as a maximum repetition number defined or configured for the first channel.

16. A wireless communication device, comprising:
a receiver, which, in operation, receives channel repetitions of a first channel in multiple subframes from a second wireless communication device in multiple hybrid automatic repeat request (HARQ) processes, the first channel being a control channel including scheduling information; and
a transceiver, which, in operation, performs one of:
  transmitting channel repetitions of the second channel in multiple subframes to the second wireless communication device in the multiple HARQ processes, the second channel being a data channel scheduled by the scheduling information; and
  receiving channel repetitions of the second channel in multiple subframes from the second wireless communication device in the multiple HARQ processes,
wherein time-frequency resources for the first channel in different HARQ processes are different.

17. The wireless communication device according to claim 16, wherein the time-frequency resources for the first channel are associated with a starting subframe of the first channel in respective HARQ processes.

18. The wireless communication device according to claim 16, wherein the first channel is Physical Downlink Control Channel (PDCCH) or Enhanced PDCCH (EPDCCH).

* * * * *